(12) United States Patent
Therrien et al.

(10) Patent No.: US 6,517,926 B1
(45) Date of Patent: Feb. 11, 2003

(54) PLASTIC LUMBER SPACING OR PILING STRIP

(76) Inventors: William N. Therrien, Box 162, Topley, British Columbia (CA), V0J 2Y0; Timothy Byman, P.O. Box 653, Houston, British Columbia (CA), V0J 1Z0

( * ) Notice: Subject to any disclaimer, the term of this patent is extended or adjusted under 35 U.S.C. 154(b) by 0 days.

(21) Appl. No.: 09/561,937

(22) Filed: May 1, 2000

(30) Foreign Application Priority Data

Apr. 29, 1999 (CA) ............................................. 2270643

(51) Int. Cl.⁷ ............................. B32B 3/00; B65D 19/38
(52) U.S. Cl. ..................... 428/156; 428/107; 428/113; 428/167; 428/182; 428/537.1; 108/53.1; 108/57.29
(58) Field of Search ................................. 428/156, 167, 428/182, 188, 107, 113, 537.1; 108/51.1, 53.1, 57.28, 57.29

(56) References Cited

U.S. PATENT DOCUMENTS

| | | | | |
|---|---|---|---|---|
| 2,571,715 A | * | 10/1951 | Henning | ...................... 428/167 |
| 3,861,326 A | * | 1/1975 | Brown | ......................... 108/51 |
| 4,816,316 A | * | 3/1989 | Robbins | ..................... 428/161 |
| 6,138,435 A | * | 10/2000 | Kocher et al. | ............. 52/800.1 |

* cited by examiner

Primary Examiner—Donald J. Loney
(74) Attorney, Agent, or Firm—Antony C. Edwards

(57) ABSTRACT

A plastic strip for supporting and spacing wood products for kiln drying or air drying. The plastic strip is rectangular and adapted to withstand high temperature, moisture and pressure under continuous re-use in the temperatures, pressures and moisture of the kiln drying process. The strip is ventilated to inhibit moist areas remaining on the wood products in the overlap between the strips and the wood products.

22 Claims, 3 Drawing Sheets

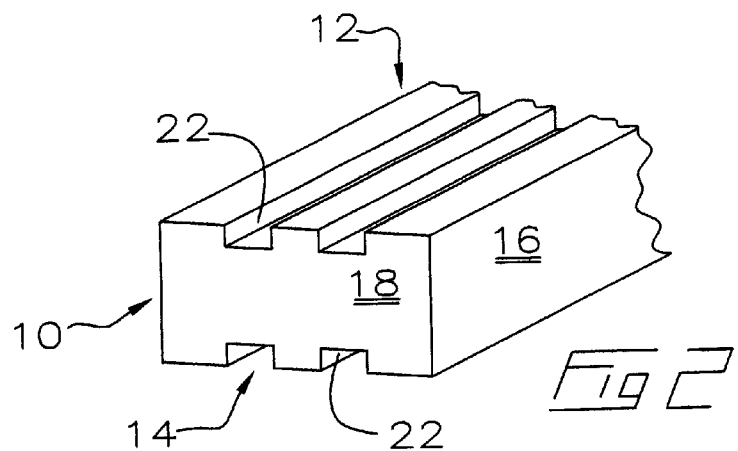
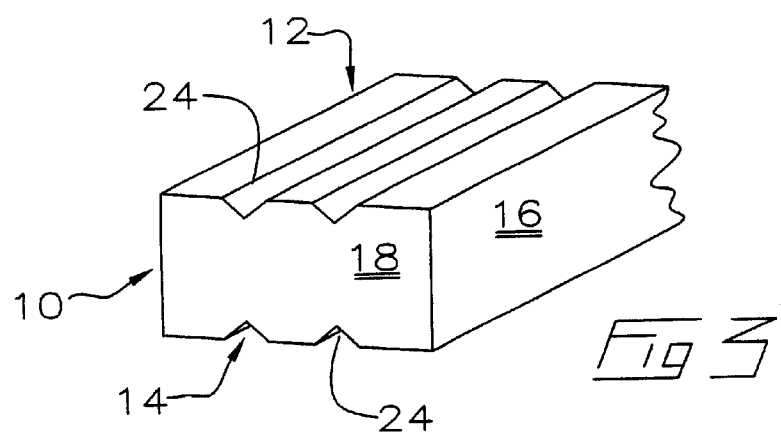
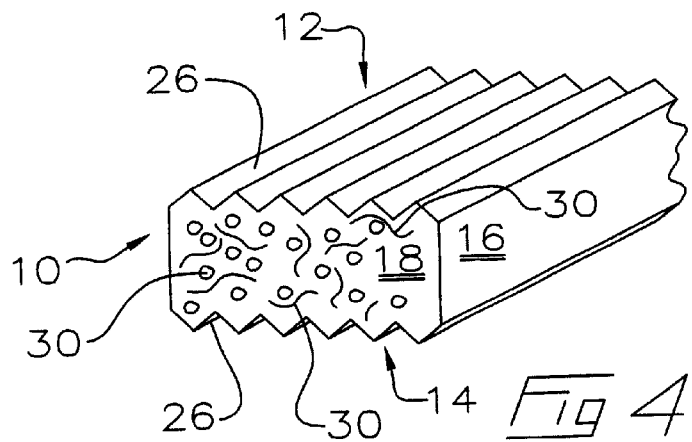

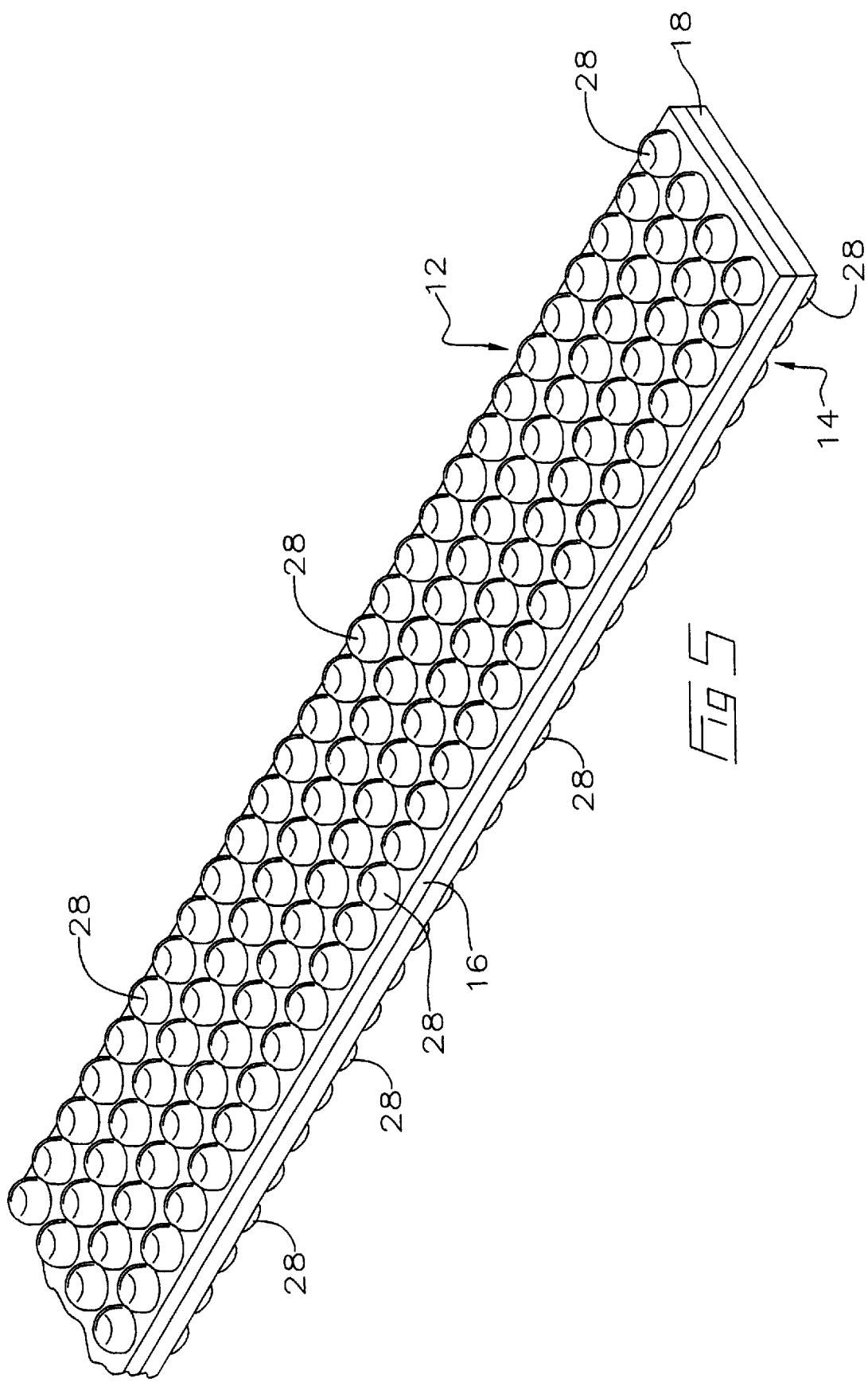

PLASTIC LUMBER SPACING OR PILING STRIP

CROSS REFERENCE TO RELATED APPLICATION

This application claims priority from Canadian Patent Application No. 2,270,643 filed Apr. 29, 1999 titled PLASTIC LUMBER SPACING OR PILING STRIP.

FIELD OF THE INVENTION

The present invention relates to a portable device, and in particular a plastic strip, for supporting and spacing wood products during a kiln or other drying process. Although used for a variety of purposes, such devices are commonly known as lumber spacing or piling strips.

BACKGROUND OF THE INVENTION

One common type of lumber spacing or piling strip is an all wood strip. An all wood strip has the disadvantage of becoming brittle and susceptible to breakage after only a few uses due to the temperatures and pressures of the kiln drying process, which may reach 230 degrees Fahrenheit at 60 pounds per square inch pressure. Strips made from wood are also susceptible to breakage during handling and reuse. Thus conventionally all wood strips have to be replaced on a continuous basis increasing the cost of wood product production.

Wood strips also have drawbacks caused by the moisture content of the wood product being dried. The moisture content may cause the wood strips to warp, check and split during the kiln drying process daring moisture loss. Perhaps more importantly, wood strips suffer from a disadvantage that they do not allow for air venting between the strips and the wood product during the drying process and so may produce wet spots in the lumber which otherwise has been dried. Further, due to the smooth planar surfaces of wood strips, the lumber products sometimes creep relative to the strips and may become warped.

It is thus desirable in the industry to have, and an object of the present invention to provide, a durable, continually re-usable, vented plastic lumber spacing or piling strip that is able to withstand the temperatures, pressures and moisture, for example, of the kiln drying process.

SUMMARY OF THE INVENTION

In summary the spacing or piling strip used for spacing or piling lumber of the present invention includes a plastic substantially parallelepiped member having opposite first and second weight-bearing surfaces thereon. The first and second surfaces are contoured to provide air venting means. Thus when the strip has at least one wood product stacked on it so as to bear against the first or second weight-bearing surface, a contact surface of the wood product in contact with the strip is dried during a drying process applied to the wood product.

In embodiments not intended to be limiting, the air venting means is:

(a) at least one channel on the first and second surfaces, wherein the channel extends from opposite edges of the strip;
(b) a plurality of channels on the first and second surfaces, wherein the plurality of channels extend from opposite edges of the strip;
(c) at least one longitudinally extending channel on the first and second surfaces, wherein the longitudinally extending channel extends from opposite edges of the strip;
(d) a plurality of longitudinally extending channels on the first and second surfaces, wherein the plurality of longitudinally extending channels extend from opposite edges of the strip;
(e) at least one groove on the first and second surfaces, wherein the groove extends from opposite edges of the strip;
(f) a plurality of grooves on the first and second surfaces, wherein the plurality of grooves extend from opposite edges of the strip;
(g) at least one longitudinally extending groove on the first and second surfaces, wherein the longitudinally extending groove extends from opposite edges of the strip;
(h) a plurality of longitudinally extending grooves on the first and second surfaces, wherein the plurality of longitudinally extending grooves extend from opposite edges of the strip;
(i) is at least one corrugation on the first and second surfaces, wherein the corrugation extends from opposite edges of the strip;
(j) a plurality of corrugations on the first and second surfaces, wherein the plurality of corrugations extend from opposite edges of the strip;
(k) at least one longitudinally extending corrugation on the first and second surfaces, wherein the longitudinally extending corrugation extends from opposite edges of the strip;
(l) a plurality of longitudinally extending corrugations on the first and second surfaces, wherein the plurality of longitudinally extend corrugations extending from opposite edges of the strip;
(m) a gridwork of bumps on the first and second surfaces, wherein the grid work extends from opposite edges of the strip; or,
(n) a gridwork of striations on the first and second surfaces, wherein the grid work extends from opposite edges of the strip.

In one embodiment the strip is a rectangular parallelepiped. It may advantageously be elongate and thin (relative to the dimensions of its weight-bearing surfaces) between the first and second surfaces.

BRIEF DESCRIPTION OF THE DRAWINGS

FIG. 1b is, in bottom plan view, the strip of FIG. 1a.

FIG. 1c is, in side elevation view, the strip of FIG. 1a.

FIG. 1d is, in end elevation view, the strip of FIG. 1a.

FIG. 2 is, in partially cut-away perspective view, a further alternative embodiment of the spacing or piling strip of the present invention.

FIG. 3 is, in partially cut-away perspective view, a further alternative embodiment of the spacing or piling strip of the present invention.

FIG. 4 is, in partially cut-away perspective view, a further alternative embodiment of the spacing or piling strip of the present invention.

FIG. 5 is, in perspective view, a further alternative embodiment of the spacing or piling strip of the present invention.

DETAILED DESCRIPTION OF PREFERRED EMBODIMENTS

Figure 1D:
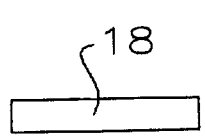
Figure 1C:
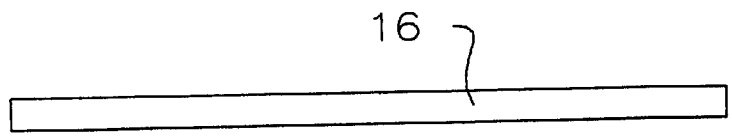
Figure 1A:
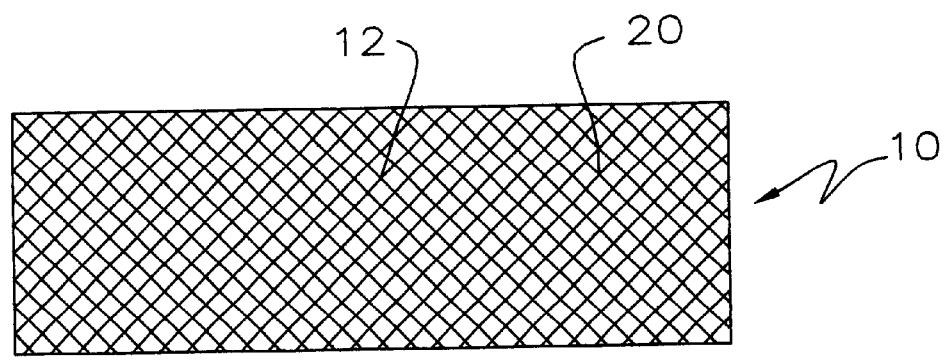
FIG. 1a is, in top plan view, one embodiment of the plastic lumber spacing or piling strip of the present invention.
Figure 1B:
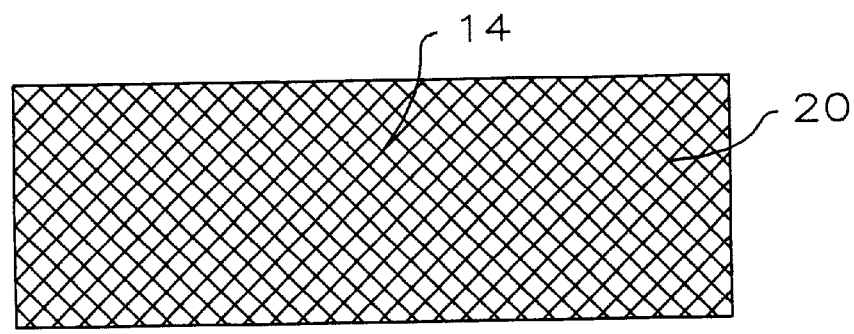

As seen in FIGS. 1–5, all of the embodiments of the plastic lumber spacing or piling strip of the present invention incorporate some means to allow venting between the strip and the wood products, such as lumber, being separated by the strips during the process of drying the wood products. As may be seen, and what is not intended to be limiting, such venting means may take the form of channels, grooves, bumps, striations or other surface variations allowing for the movement of air between the strips and the wood product to thereby reduce the likelihood of wet spots being left on the wood products following the drying process.

Thus as seen in FIGS. 1a–1d, strip 10 is generally rectangular in plan form and in three dimension may be described as parallelepiped, the specific illustrated embodiment being a rectangular parallelepiped having an upper surface 12, an opposite lower surface 14, a pair of opposite side surfaces 16, and a pair of opposite end surfaces 18. Upper and lower surfaces 12 and 14 have a grid work of striations 20 formed thereon to facilitate venting between strip 10 and wood products (not shown) stacked on top and beneath strips 10. Striations 20 also provide for increased frictional engagement between strips 10 and the wood products.

In alternative embodiments of the present invention, strips 10 may, instead of striations 20, have channels 22 as seen in FIG. 2 formed in upper and lower surfaces 12 and 14, or may have grooves 24 formed in upper and lower surfaces 12 and 14 as seen in FIG. 3, or upper and lower surfaces 12 and 14 may be corrugated as seen in FIG. 4. It is understood that, although shown as longitudinally extending, channels 22, grooves 24 and corrugations 26 may also be laterally extending channels, grooves and corrugations. In the further alternative embodiment of FIG. 5, strip 10 have conical or hemispherical bumps 28 on upper and lower surfaces 12 and 14 to facilitate venting.

Without intending to be limiting, embodiments of the present invention may be manufactured polypropylene, polyethylene, ABS, nylon, thermoplastics, polyester and polyurethanes. Further, such plastics may also be used as a matrix to hold fibers, strands or other fillers 30 such as seen in FIG. 4, which advantageously, are naturally occurring waste by-products such as wood fibers, bark, sawdust, or other wood waste. The advantage of reintroducing wood into strip 10 in this fashion is that, because the wood strand or filler material is encapsulated within the plastic of the strip, the wood is no longer affected by moisture and yet, at least in respect of the wood strands or fibers, strengthens the plastic, and reduces the cost to produce the strips. In one embodiment, a polypropylene/wood filler mix ratio has been employed in the relative volumetric ranges of 50:50–60:40. Strips 10 may thus economically be as a reusable alternative to, for example, 1×4 wood strips.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A spacing or piling strip used for spacing or piling lumber, said strip comprising a single, elongate, substantially parallelepiped strip member having opposite first and second weight-bearing surfaces thereon, said first and second surfaces contoured to provide air venting means, wherein said strip member is adapted for use in spacing apart layers of lumber in a stack of lumber during kiln drying and includes, within said member, wood waste by-products held in a plastic matrix.

2. The spacing or piling strip of claim 1 wherein said air venting means is at least one channel on said first and second surfaces, said at least one channel extending from opposite edges of said strip.

3. The spacing or piling strip of claim 1 wherein said air venting means is a plurality of channels on said first and second surfaces, said plurality of channels extending from opposite edges of said strip.

4. The spacing or piling strip of claim 1 wherein said air venting means is at least one longitudinally extending channel on said first and second surfaces, said at least one longitudinally extending channel extending from opposite edges of said strip.

5. The spacing or piling strip of claim 1 wherein said air venting means is a plurality of longitudinally extending channels on said first and second surfaces, said plurality of longitudinally extending channels extending from opposite edges of said strip.

6. The spacing or piling strip of claim 1 wherein said air venting means is at least one groove on said first and second surfaces, said at least one groove extending from opposite edges of said strip.

7. The spacing or piling strip of claim 1 wherein said air venting means is a plurality of grooves on said first and second surfaces, said plurality of grooves extending from opposite edges of said strip.

8. The spacing or piling strip of claim 1 wherein said air venting means is at least one longitudinally extending groove on said first and second surfaces, said at least one longitudinally extending groove extending from opposite edges of said strip.

9. The spacing or piling strip of claim 1 wherein said air venting means is a plurality of longitudinally extending grooves on said first and second surfaces, said plurality of longitudinally extending grooves extending from opposite edges of said strip.

10. The spacing or piling strip of claim 1 wherein said air venting means is at least one corrugation on said first and second surfaces, said at least one corrugation extending from opposite edges of said strip.

11. The spacing or piling strip of claim 1 wherein said air venting means is a plurality of corrugations on said first and second surfaces, said plurality of corrugations extending from opposite edges of said strip.

12. The spacing or piling strip of claim 1 wherein said air venting means is at least one longitudinally extending corrugation on said first and second surfaces, said at least one longitudinally extending corrugation extending from opposite edges of said strip.

13. The spacing or piling strip of claim 1 wherein said air venting means is a plurality of longitudinally extending corrugations on said first and second surfaces, said plurality of longitudinally extending corrugations extending from opposite edges of said strip.

14. The spacing or piling strip of claim 1 wherein said air venting means is a gridwork of bumps on said first and second surfaces, said grid work extending from opposite edges of said strip.

15. The spacing or piling strip of claim 1 wherein said air venting means is a gridwork of striations on said first and second surfaces, said grid work extending from opposite edges of said strip.

16. The spacing or piling strip of claim 1 wherein said strip is a rectangular parallelepiped.

17. The spacing or piling strip of claim 16 wherein said strip is elongate and thin between said first and second surfaces.

18. The spacing or piling strip of claim 1 wherein said wood waste by-products include wood waste fillers chosen from the group consisting of wood fibers, strands, bark, and sawdust.

19. The spacing or piling strip of claim 1 wherein said wood waste by-products are totally encapsulated within said plastic matrix whereby said by-products are not affected by moisture external to said member.

20. The spacing or piling strip of claim 19 wherein said wood waste by-products include wood waste fillers chosen from the group consisting of wood fibers, strands, bark, and sawdust.

21. The spacing or piling strip of claim 18 wherein the ratio by volume of said plastic matrix to said wood waste filler is in the range between 50:50 and 60:40.

22. The spacing or piling strip of claim 20 wherein the ratio by volume of said plastic matrix to said wood waste filler is in the range between 50:50 and 60:40.

* * * * *